UNITED STATES PATENT OFFICE.

WILLIAM T. JEBB, OF BUFFALO, NEW YORK.

METHOD OF MANUFACTURING MALT LIQUORS FROM STARCH.

SPECIFICATION forming part of Letters Patent No. 347,612, dated August 17, 1886.

Application filed April 19, 1886. Serial No. 199,379. (No specimens.)

*To all whom it may concern:*

Be it known that I, WILLIAM T. JEBB, of the city of Buffalo, in the county of Erie and State of New York, have invented a new and useful Improvement in a Method of Manufacturing Malt Liquors from Starch, of which the following is a specification.

This invention relates to an improvement in the method of preparing starch and similar products from Indian corn or maize, and the treatment of such products in the manufacture of beer and ale.

In practicing my invention the corn is first hulled in any suitable or well-known manner. In order to accomplish this object, the corn is passed through a hulling or hominy machine of any suitable construction, the corn having been previously softened or steamed, if thought best, to better secure the separation of the different parts. The hulls are then separated from the hominy or hulled corn by sifting or air-currents, or both. The fine flour or starch-meal produced in the operation of hulling is also separated from the hominy at the same time. The hominy or hulled corn is next coarsely ground, crushed, or otherwise reduced, so as to liberate the germs and starch particles and detach the same from the coarser fragments of the hard, flinty, or glutinous portions of the kernels. The reduced material is next separated, so as to free the fragments of hard flinty material from the starch-flour and ground germ. This separation is preferably effected by a shaking or rolling screen; but any other suitable separating-machine may be employed. If the resulting flinty material or grits is not sufficiently reduced, or is not sufficiently freed from the starch and germs, the material is reground one or more times, as may be necessary, until the desired degree of fineness is obtained and the starch and germs have been sufficiently detached from the grits or fragments of hard flinty material. This material is separated from the starch and germs by sifting, as above explained, after regrinding, and, if desired, it may be purified by subjecting it to the action of air-currents in a suitable separating-machine. The material so obtained is of about the fineness of farina or grits. This material is next developed or boiled in a closed developing tank or vessel under pressure and at a temperature of about 230° Fahrenheit, for the purpose of preparing the material for mashing. This closed developing-tank is of any suitable construction, and is provided with inlets and outlets for the material, a revolving agitator or stirrer, steam-pipes, a safety-valve, and a pressure-gage for determining the pressure. The grits or reduced hard material is mixed in this tank with water and boiled under a steam-pressure, preferably of from thirty to forty pounds to the square inch, until the material has been fully developed or softened. The operation of developing proceeds rapidly and uniformly, owing to the uniformity of the material under treatment.

The malt which is used in connection with the grits for preparing the wort is placed in the mash-tub and developed therein at a temperature preferably of from 145° to 150° Fahrenheit. When the malt has been properly developed, the developed grits or liquid is introduced into the mash-tub at about the above temperature (145° to 150°) and thoroughly mixed with the malt liquor. The mixture is then mashed until a wort of the desired strength and quality is obtained. While I prefer to conduct the operations of developing and mashing as explained, they may be modified as to duration and temperature as the condition of the material and the nature of the desired ultimate product may render expedient.

The wort or extract is readily formed in the mash-tub and runs off freely and clear, as the quantity of insoluble matter in the mash—such as hulls, &c.—is greatly reduced. The wort is then boiled, the hops are added, the liquid is drained off and cooled, fermented, and further treated in any usual or suitable manner to produce the desired ultimate product.

The separated hulls can be advantageously used as cattle-feed, and the separated starch and germs form a nutritious flour or meal which may be used for culinary purposes.

I claim as my invention—

1. The herein-described method of producing a wort suitable for the manufacture of beer or ale, which consists in developing, under pressure, the grits composed of the reduced hard or flinty portions of the kernels of corn, then mashing the developed grits and the malt, and then draining off the wort, substantially as set forth.

2. The herein-described method of producing a wort suitable for the manufacture of beer or ale, which consists in separating the grits, composed of the reduced hard or flinty portions of the kernels of corn, from the hulls and starch, then developing said grits under pressure, then mashing the developed grits and the malt, and then draining off the wort, substantially as set forth.

3. The herein-described method of manufacturing beer or ale, which consists in developing, under pressure, the grits composed of the reduced hard or flinty portions of the kernels of corn, then mashing the developed grits and the malt, then draining off the wort, then boiling the wort, adding the hops, draining off the liquid, and cooling and fermenting the same, substantially as set forth.

Witness my hand this 14th day of April, 1886.

WILLIAM T. JEBB.

Witnesses:
WM. H. CARR,
AUSTIN TYLER.